(12) United States Patent
Shu et al.

(10) Patent No.: US 11,604,850 B2
(45) Date of Patent: Mar. 14, 2023

(54) IN-MEMORY FULL ADDER

(71) Applicant: GSI Technology Inc., Sunnyvale, CA (US)

(72) Inventors: LeeLean Shu, Los Altos, CA (US); Avidan Akerib, Tei Aviv (IL)

(73) Assignee: GSI Technology Inc., Sunnyvale, CA (US)

( * ) Notice: Subject to any disclaimer, the term of this patent is extended or adjusted under 35 U.S.C. 154(b) by 520 days.

(21) Appl. No.: 16/740,584

(22) Filed: Jan. 13, 2020

(65) Prior Publication Data

US 2020/0151236 A1    May 14, 2020

Related U.S. Application Data

(63) Continuation of application No. 15/708,181, filed on Sep. 19, 2017, now Pat. No. 10,534,836.

(60) Provisional application No. 62/430,767, filed on Dec. 6, 2016, provisional application No. 62/430,372, filed on Dec. 6, 2016.

(51) Int. Cl.
*G06F 17/11* (2006.01)
*G06F 7/48* (2006.01)
*G06F 7/501* (2006.01)
*G06F 7/506* (2006.01)

(52) U.S. Cl.
CPC ............ *G06F 17/11* (2013.01); *G06F 7/4824* (2013.01); *G06F 7/501* (2013.01); *G06F 7/506* (2013.01)

(58) Field of Classification Search
CPC ........ G06F 17/11; G06F 7/4824; G06F 7/501; G06F 7/506
See application file for complete search history.

(56) References Cited

U.S. PATENT DOCUMENTS

| 7,617,269 | B2 | 11/2009 | Dewan |
| 9,558,812 | B2 | 1/2017 | Akerib |
| 2008/0252334 | A1 | 10/2008 | Sood |
| 2010/0042903 | A1 | 2/2010 | Gunnam |

(Continued)

FOREIGN PATENT DOCUMENTS

| CN | 1366234 A | 8/2002 |
| CN | 101178645 A | 5/2008 |
| EP | 03625480 B1 | 4/1996 |

OTHER PUBLICATIONS

English Abstract of CN1366234 downloaded from Google Patents website on May 10, 2020.

(Continued)

*Primary Examiner* — Michael D. Yaary
(74) *Attorney, Agent, or Firm* — Heidi Brun Associates Ltd.

(57) ABSTRACT

A non-destructive memory array implements a full adder. The array includes a column connected by a bit line and a full adder unit. The column stores a first bit in a first row of the bit line, a second bit in a second row of the bit line, and an inverse of a carry-in bit in a third row of the bit line. The full adder unit stores, in the second and third rows of the bit line, a sum bit and a carry out bit output, respectively, of adding the first bit, the second bit and the carry-in bit. The full adder unit does not overwrite any of the bits when a full adder table indicates that the sum bit and the carry out bit are equivalent to the second bit and the carry-in bit.

4 Claims, 13 Drawing Sheets

(56) References Cited

U.S. PATENT DOCUMENTS

2011/0013442 A1   1/2011  Akerib
2012/0075940 A1*  3/2012  Toda .................... G11C 7/1006
                                                            365/189.16

OTHER PUBLICATIONS

English Abstract of CN101178645 downloaded from Google Patents website on May 10, 2020.
Sun Jinping, "Simulation design and analysis of full adder function and application", vol. 19, No. 9, Electronic Design Engineering, Sep. 5, 2011.
S.B. Furber et al., "A Novel Area-Efficient Binary Adder", Conference Record of the Thirty Fourth Asilomar Conference on Signals, Systems and Computers, Aug. 6, 2002.

* cited by examiner

| Input | overflow | Col 1 | Col 2 | Col 3 | Col 4 |
|---|---|---|---|---|---|
| OP_A | | 0 | 1 | 0 | 1 |
| OP_B | | 1 | 1 | 1 | 0 |
| OP_CY' | 1 | 1 | 1 | 1 | 1 |
| S | | 1 | 1 | 1 | 0 |

Input bits

700

| | $CTS_1$ | $CTS_2$ | $CTS_3$ | $CTS_4$ |
|---|---|---|---|---|
| A | 0 | 0 | 1 | 1 |
| B | 0 | 1 | 1 | 0 |
| CY' | 0 | 0 | 1 | 1 |
| RO | 1 | 0 | 0 | 1 |

Computation Table

Computation Table 410

| | CTS₁ | CTS₂ | CTS₃ | CTS₄ |
|---|---|---|---|---|
| A | 0 | 0 | 1 | 1 |
| B | 0 | 1 | 1 | 0 |
| CY' | 0 | 0 | 1 | 1 |
| RO | 1 | 0 | 0 | 1 |

710

| Input | Overflow | Col1 | Col2 | Col3 | Col4 |
|---|---|---|---|---|---|
| OP_A | | 0 | 1 | 0 | 1 |
| OP_B | | 1 | 1 | 1 | 0 |
| OP_CY' | 1 | 1 | 1 | 1→1 | 1 |
| S | | 1 | 1 | 1 | 0→1 |

Col4 (101) == CTS1 (000). No
Col4 (101) == CTS2 (010). No
Col4 (101) == CTS3 (111). No
Col4 (101) == CTS4 (101). Yes
S = CY' = 1

720

| Input | Overflow | Col1 | Col2 | Col3 | Col4 |
|---|---|---|---|---|---|
| OP_A | | 0 | 1 | 0 | 1 |
| OP_B | | 1 | 1 | 1 | 0 |
| OP_CY' | 1 | 1 | 1 | 1 | 1 |
| S | | 1 | 1 | 1 | 1 |

Col3 (011) == CTS1 (000). No
Col3 (011) == CTS2 (010). No
Col3 (011) == CTS3 (111). No
Col3 (011) == CTS4 (101). No

730

| Input | Overflow | Col1 | Col2 | Col3 | Col4 |
|---|---|---|---|---|---|
| OP_A | | 0 | 1 | 0 | 1 |
| OP_B | | 1 | 1 | 1 | 0 |
| OP_CY' | 1 | 1→0 | 1 | 1 | 1 |
| S | | 1 | 1→0 | 1 | 1 |

Col2 (111) == CTS1 (000). No
Col2 (111) == CTS2 (010). No
Col2 (111) == CTS3 (111). Yes
S = CY' = 0
Col2 (111) == CTS4 (101). No

740

| Input | Overflow | Col1 | Col2 | Col3 | Col4 |
|---|---|---|---|---|---|
| OP_A | | 0 | 1 | 0 | 1 |
| OP_B | | 1 | 1 | 1 | 0 |
| OP_CY' | 1→0 | 0 | 1 | 1 | 1 |
| S | | 1→0 | 0 | 1 | 1 |

Col1 (010) == CTS1 (000). No
Col1 (010) == CTS2 (010). Yes
S=C'=0
Col1 (010) == CTS3 (111). Yes
Col1 (010) == CTS4 (101). No

Fig. 7

| | CTS1 | CTS2 | CTS3 | CTS4 |
|---|---|---|---|---|
| A' | 1 | 1 | 0 | 0 |
| B' | 1 | 0 | 0 | 1 |
| CY | 1 | 1 | 0 | 0 |
| A | 0 | 0 | 1 | 1 |
| B | 0 | 1 | 1 | 0 |
| CY' | 0 | 0 | 1 | 1 |
| RO | 1 | 0 | 0 | 1 |

Computation Table

| | CTS1 | CTS2 | CTS3 | CTS4 |
|---|---|---|---|---|
| A' | 1 | 1 | 0 | 0 |
| B' | 1 | 0 | 0 | 1 |
| CY | 1 | 1 | 0 | 0 |
| A | 0 | 0 | 1 | 1 |
| B | 0 | 1 | 1 | 0 |
| CY' | 0 | 0 | 1 | 1 |
| RO S | 1 | 0 | 0 | 1 |
| RO CY' | 1 | | | 1 |

Computation Table

IN-MEMORY FULL ADDER

CROSS REFERENCE TO RELATED APPLICATIONS

This application is a continuation of U.S. patent application Ser. No. 15/708,181, filed Sep. 19, 2017, which claims priority from U.S. provisional patent applications 62/430,372, filed Dec. 6, 2016, and 62/430,767, also filed on 6 Dec. 2016, all of which are incorporated herein by reference.

FIELD OF THE INVENTION

The present invention relates to associative computation generally and to a full adder implementation using associative computation in particular.

BACKGROUND OF THE INVENTION

An adder is a digital circuit that performs addition of numbers. The most common adders operate on binary numbers. Binary numbers represent numeric values using only two different symbols: 0 and 1. Each digit of a binary number represents an increasing power of 2, with the rightmost digit representing $2^0$, the next representing $2^1$, then $2^2$, and so on. The value of a binary number can be calculated by Equation 1:

$$X \times 2^0 + Y \times 2^1 + Z \times 2^2 \qquad \text{Equation 1}$$

where X, Y, Z etc. can have the value of 0 or 1.

Adding two single-digit binary numbers A and B is relatively simple. The sum of A+B is S and CY, where sum S is equal to X in Equation 1 and CY, which is a "carry bit", is equal to Y in Equation 1.

Thus, the four possible ways to add two one-bit numbers A and B produce:

$0+0 \rightarrow S=0, CY=0$ (a)

$0+1 \rightarrow S=1, CY=0$ (b)

$1+0 \rightarrow S+1, CY=0$ (c)

$1+1 \rightarrow S=0, CY=1$ (d)

In many computers and other kinds of processors, adders are used not only in the arithmetic logic units, but also in other parts of the processor, where they are used to calculate addresses, table indices, increment and decrement operators, and similar operations.

FIG. 1 to which reference is now made illustrates a one-bit half adder 100, a one-bit full adder 110 and a multi-bit adder 120, all known in the art.

One-bit half adder 100, known in the art, adds two single binary digits A and B and has two outputs, a sum S and a carry $CY_{out}$. The carry represents an overflow into the next digit of a multi-digit addition.

A full adder 110, adds binary numbers and accounts for values carried in as well as those carried out. One-bit full adder 110 adds three one-bit numbers, A, B, and $CY_{in}$, where A and B are the bits to add and $CY_{in}$ is a bit carried in from a previous one-bit full adder operation. The output of the full adder is S and $CY_{out}$ where S is the calculated sum of the three input bits and $CY_{out}$ is a bit carried out.

Multi-bit adder 120, is constructed from multiple one-bit full adders to add two N-bit numbers P and Q. Each full adder input, in addition to a bit A from P and a bit B from Q, receives an input carry bit $CY_{in}$, which is the output carry bit $CY_{out}$ of the previous adder. Note that the first (and only the first) full adder always has a zero valued carry in bit $CY_{in}=0$ as there is no carry in from a previous step. The example of multi-bit adder 120 is a four-bit adder and is constructed from four one-bit adders 110 connected such that the carry out of one adder is the carry in of the next adder. The output of multi-bit adder 120 is a multi-bit number R constructed from the resulting bits S of each full adder 110 and the $CY_{out}$ of the last (leftmost) full adder.

FIG. 2, to which reference is now made, is the truth table 200 of a one-bit full adder. Each row in table 200 provides a possible permutation of input values for each of the input bits A, B, and $CY_{in}$. Table 200 also lists the expected output S, which is the result of the sum $A+B+CY_{in}$, and the carry out bit $CY_{out}$ which is the output carry of the sum operation for each permutation.

In line 210, the values of the input bits are A=0, B=0, and $CY_{in}=0$. The resulting binary sum is 0 (0+0+0) and, thus the value of S is 0 and the value of $CY_{out}$ is 0. In lines 220, 230 and 250 the value of one of the input bits is 1 and the value of the two other bits is 0. The resulting binary sum is 1 and therefore, the value of S is 1 and of $CY_{out}$ is 0. In lines 240, 260, and 270 the value of one of the bits is 0 and the value of the two other bits is 1. The binary sum (1+1+0) is 10, where the sum S is 0 and carry out $CY_{out}$ is 1. In line 280 the value of all the input bits is 1 so the result is 11 (1+1+1) and therefore the value of S is 1 and of $CY_{out}$ is 1.

The full adder can be implemented by many digital circuits, having many combinations of logic gates. A full adder has also been implemented within an in-memory computation device, described in U.S. patent application Ser. No. 15/146,908 filed on May 5, 2016, and assigned to the common assignee of the present application. U.S. patent application Ser. No. 15/146,908 is incorporated herein by reference. The associative computation of the full adder described in U.S. patent application Ser. No. 15/146,908 takes 12 clock cycles.

SUMMARY OF THE PRESENT INVENTION

There is provided, in accordance with a preferred embodiment of the present invention, a non-destructive memory array to implement a full adder. The array includes a column connected by a bit line and a full adder unit. The column stores a first bit in a first row of the bit line, a second bit in a second row of the bit line, and an inverse of a carry-in bit in a third row of the bit line. The full adder unit stores, in the second and third rows of the bit line, a sum bit and a carry out bit output, respectively, of adding the first bit, the second bit and the carry-in bit. The full adder unit does not overwrite any of the bits when a full adder table indicates that the sum bit and the carry out bit are equivalent to the second bit and the carry-in bit.

Moreover, in accordance with a preferred embodiment of the present invention, the full adder unit includes a computation table, a row decoder and a column decoder. The computation table stores a set of change trigger sequences, and an associated value for the sum and carry-out bits per sequence. The row decoder activates the first, the second and the third rows according to the set of change trigger sequences, one current sequence at a time. The column decoder receives a compare result from the bit line indicating a match of data stored in the column to the current change trigger sequence. The row decoder activates a sum row and a carry-out row of the memory array and the column decoder writes a sum bit and a carry-out bit associated with the current change trigger sequence in the sum row and the carry-out row through the bit line if the compare result indicates a match.

Further, in accordance with a preferred embodiment of the present invention, the set of change trigger sequences are 000, 010, 111 and 101 and their associated values for the sum and carry-out bits are 1, 0, 0 and 1 respectively.

Finally, in accordance with a preferred embodiment of the present invention, the memory array includes a plurality of the columns and the full adder unit operates on the plurality of columns in parallel.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 3B is a full adder truth table using the inverse value of the carry-in;

FIGS. 4A and 4B are schematic illustrations of a computation table and its creation logic from the full adder truth table with the inverse value of the carry in;

FIGS. 6 and 7 are illustrations of an example of a multi-bit adder using the one-bit full adder of FIG. 5;

FIGS. 8 and 9 are illustrations of one exemplary multi-bit full adder constructed and operative in accordance with a preferred embodiment of the present invention capable of adding two multi-bit numbers;

Figure 1:
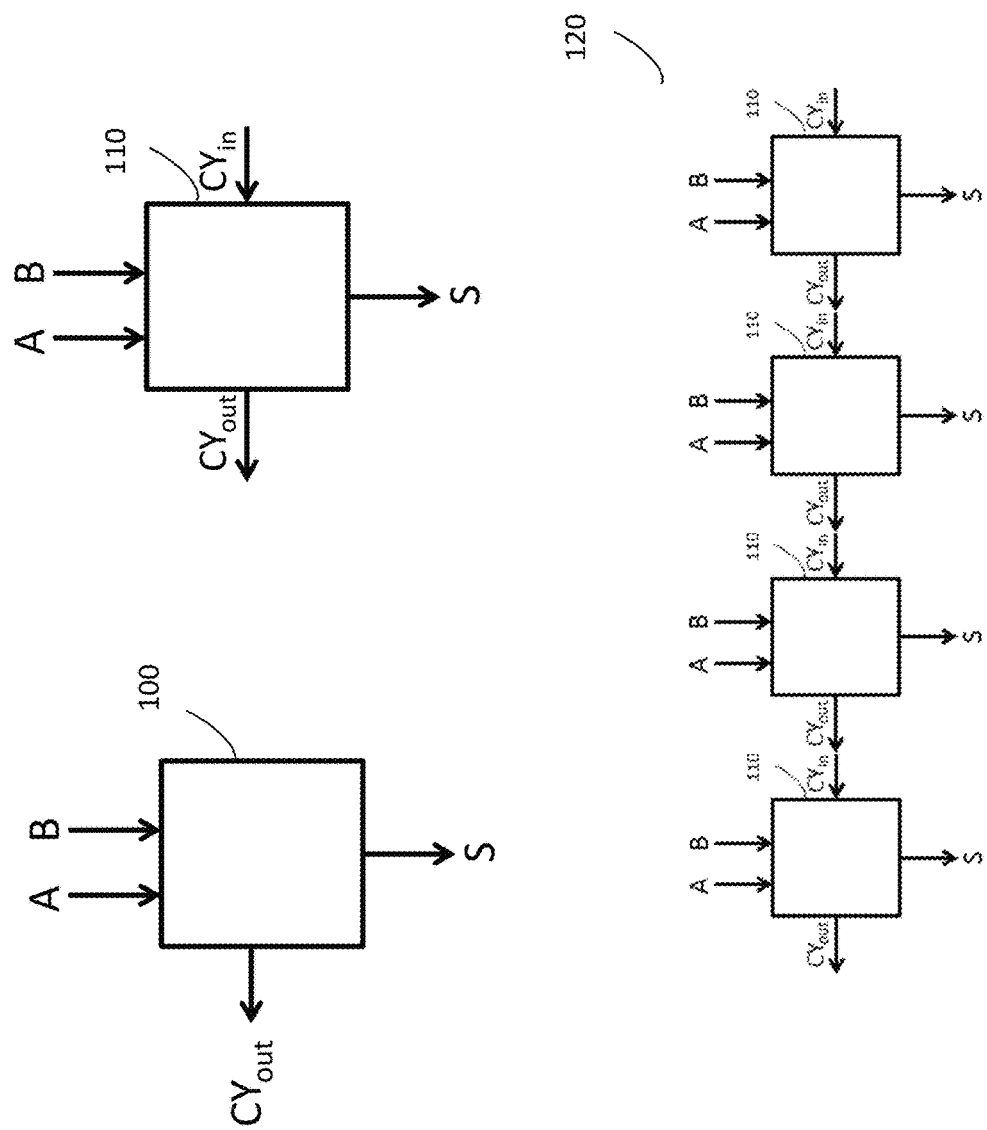
FIG. 1 is an illustration of a one-bit half adder, a one-bit full adder and a multi-bit adder, all known in the art.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 2:
FIG. 2 is the standard truth table of a one-bit full adder.

Applicant has noted that, for some of the rows in the full adder truth table 200 of FIG. 2, the values of the output elements S and $CY_{out}$ are exactly the same as the values of the input elements B and $CY_{in}$. Such is the case, for example, in row 210, where the values of B and $CY_{in}$ are both 0, as are the values of S and $CY_{out}$. Applicant has realized that, for an in-memory computation, using the same memory cells to store both input elements B and $CY_{in}$ and output elements S and $CY_{out}$ (i.e. B and S are stored in the same location and $CY_{in}$ and $CY_{out}$ are stored in the same location) may optimize the computation. When the input and output have the same values, there is no need to perform a write operation for the result, which may improve the efficiency of the full adder computation.

Using shared cells for input and output may eliminate the need to write in some cases, however, for some other cases, the values of the input elements (B and $CY_{in}$), and the values of the output elements (S and $CY_{out}$) differ, and the new value should be written to the shared cells. Such is the case, for example, in row 220, where the value of B is 0 while the value of S (sharing the same cell as B) is 1 and where the value of $CY_{in}$ is 1 while the value of $CY_{out}$ (sharing the same cell as $CY_{in}$) is 0.

Figure 3B:
Figure 3A:
FIG. 3A is the standard truth table of a one-bit full adder highlighting changes between input and output bit values.

FIG. 3A, to which reference is now made, illustrates the standard full adder truth table 200', with a square around those bits whose input values differ from the output values. These differences imply that a write operation may be needed. The in-memory full adder needs to detect such cases and to implement the needed changes.

The comparison between the value of input cells B and $CY_{in}$ to the value of output cells S and $CY_{out}$ in truth table 200' in FIG. 3A shows six changes.

Two changes in line 2: the value B is 0 while the value of S is 1 and the value of $CY_{in}$ is 1 while the value of $CY_{out}$ is 0.

One change in line 4: the value B is 1 while the value of S is 0.

One change in line 5: the value B is 0 while the value of S is 1.

Two changes in line 7: the value B is 1 while the value of S is 0 and the value of $CY_{in}$ is 0 while the value of $CY_{out}$ is 1.

In all other lines of the table, lines 1, 3, 6 and 8 the output values are the same as the input values.

A full adder system implementing write operations only for changes may need six cycles to complete the computation. In four out of eight possible cases the output differs from the input. In two out of these four cases, the change may be implemented in a single write operation (lines 4 and 5) and in the other two cases (in lines 2 and 7) two write operations are needed since both 0 and 1 need to be written and both values cannot be written in a single cycle.

Applicant has further examined truth table 200' of FIG. 3A and realized that it is possible to further reduce the number of write operations by using the inverse of the carry in both input and output. The inverse of the carry is marked herein as CY', as illustrated in table 300 of FIG. 3B, to which reference is now made. As can be seen, using the inverse carry CY' may result in having the same value in both columns B and $CY'_{in}$, in lines 2 and 7, while keeping the total number of cases (four) where a change needs to be written.

Using inverse carry CY' may reduce the total number of changes between input and output to four (instead of six). In line 2 of table 300 the value of both B and $CY'_{in}$ is 0 and the value of both S and $CY'_{out}$ is 1. Lines 4 and 5 are similar to lines 4 and 5 of FIG. 3A, and in line 7 the value of B and $CY'_{in}$ is 1 and the value of S and $CY'_{out}$ is 0. All the other lines of the table, lines 1, 3, 6 and 8, remain unchanged as in FIG. 3A.

Lines 2, 4, 5 and 7, in which the output differ from the input are of interest and are referred herein as "focal lines". The value of input bits A, B and $CY'_{in}$ in each of those lines is referred herein as "change trigger sequence" (CTS) and the value of output bits S and $CY'_{out}$ (the value of the sum and the value of the carry-out bits) in those lines are referred herein as "required output" (RO).

Figure 4A:
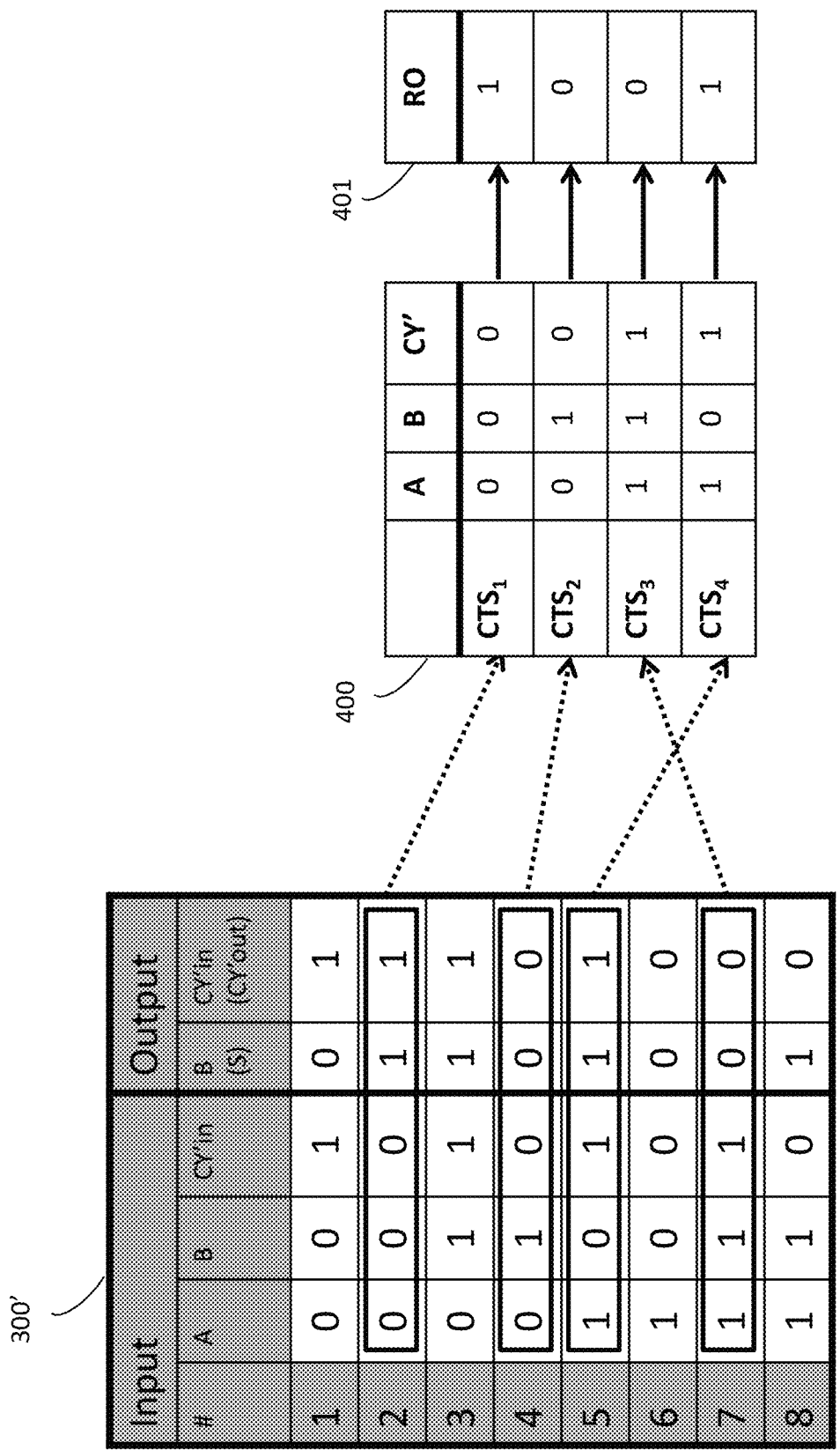
Figure 4B:
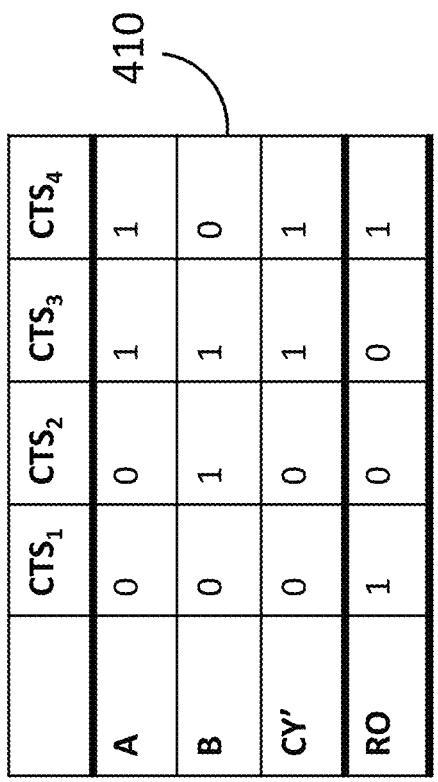

FIGS. 4A and 4B, to which reference is now made, illustrate how a computation table 410, constructed and operative in accordance with a preferred embodiment of the present invention, is created from the full adder truth table using the inverse of the carry. Computation table 410 is the main logic used by the full adder system described hereinbelow.

FIG. 4A illustrates the truth table 300' of the full adder using the inverse of the carry, CY', (similar to FIG. 3B) both in the input—$CY'_{in}$ and in the output—$CY'_{out}$ with a rectangle around the focal line. The full adder computation is implemented by comparing the input values of A, B and $CY'_{in}$ referred herein as input sequence bits (ISB) to the four change trigger sequences (CTSs). If the ISB is identical to one of the four CTSs, a new value is written to S and to $CY'_{out}$ according to the value of the required output (RO) of the corresponding focal line. Otherwise, (the ISB does not match any of the four CTSs, i.e. the input is identical to one of the other "non-focal" lines), no change is made.

The ISB (comprising input bits A, B and $CY'_{in}$) may match a single CTS as a CTS represents a possible permutation in the truth table. Using the same memory location for both input B and output S may result in changing the value stored in the memory location of input bit B. This change may result in a new ISB (comprising original input bit A, new value of B and $CY'_{in}$ whether original or new) that may match another CTS. If all CTS are checked against the ISB, an additional match may result in an additional change of B that should be avoided. Applicant has realized that comparing the ISB to the CTSs in a specific order may avoid that from happening. The CTSs were built in an order that ensures that an RO of a compared CTS may not result in an ISB that may match any of the next CTSs.

Table 400 includes the four created CTSs. CTS 1 (000) is created from A, B and $CY'_{in}$, of line 2 in table 300'. CTS 2 (010) is created from A, B and $CY'_{in}$ of line 4, CTS 3 (111) is created from the value of bits A, B and $CY'_{in}$ of line 7 and CTS 4 (101) is created from A, B and $CY'_{in}$ of line 5. It may be appreciated that the order of CTSs ensures a single match at most and should be kept for comparison with the ISB: first compare the ISB to CTS1, then to CTS2, CTS3 and CTS4. An RO table 401 is created from the value of S and $CY'_{out}$ (which are identical) of the relevant focal line and may indicate the value to be written to the relevant output locations (S and optionally $CY'_{out}$).

Applicant has realized that, in some of the cases (i.e. in CTS2 and CTS4) the value of $CY'_{out}$ and $CY'_{in}$ are the same thus whether the value of $CY'_{out}$ is overwritten by $CY'_{in}$ or not does not change the final value of $CY'_{out}$ so it is possible both to overwrite $CY'_{out}$ or not to overwrite it.

FIG. 4B illustrates computation table 410, created by attacking tables 400 and 401 and transposing the resultant table. The first three lines of the table contain the value of input bits A, B and $CY'_{in}$ comprising the ISB and a line RO containing the value to write on S and CY' associated with each CTS (recall that the value is the same for S and for CY'). It may be emphasized that the computation table may be implemented in many ways, and not necessarily in rows and columns, as long as the CTSs and their associated RO are clearly identifiable.

A full adder system, using CY' instead of CY, implementing write operations only for changes may result in a full adder whose theoretical computation takes only four steps. In each step, a different CTS is compared to the ISB and an RO is written only if needed.

Figure 5:
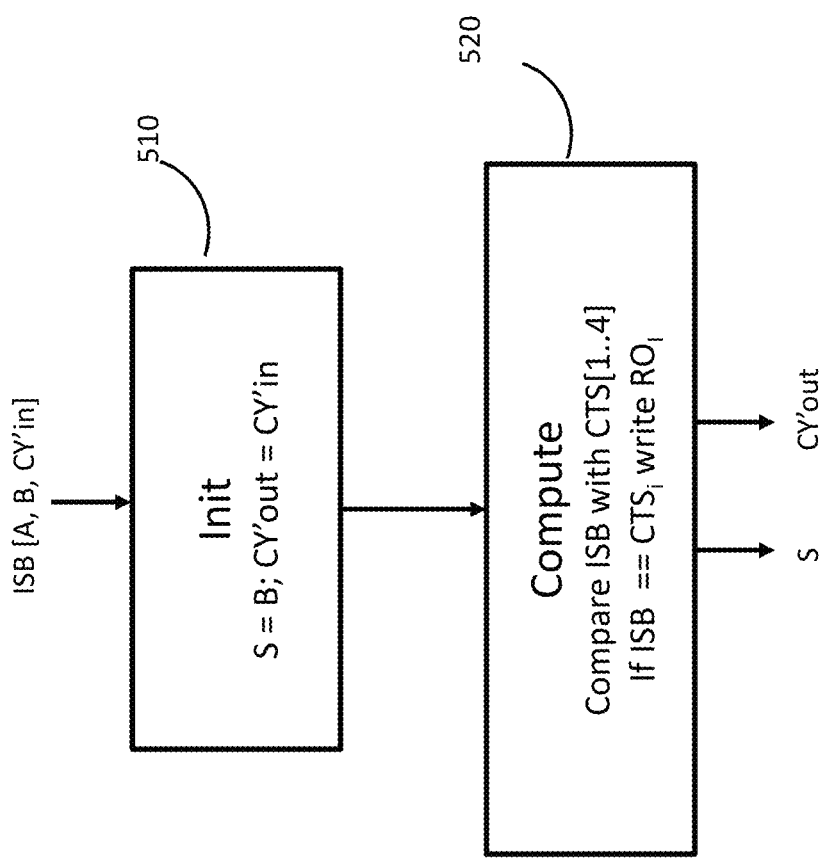
FIG. 5 is an illustration of the flow of operations of a one-bit full adder constructed and operative in accordance with a preferred embodiment of the present invention.

FIG. 5, to which reference is now made, illustrates the flow of operations of a one-bit full adder, constructed and operative in accordance with a preferred embodiment of the present invention. The flow comprises an init step 510 and a compute step 520.

Init step 510 of the flow comprises receiving three input bits A, B and $CY'_{in}$ (the ISB), initiating the value of S with the value of B and the value of $CY'_{out}$ with the value of $CY'_{in}$.

Compute step 520 of the flow comprises: comparing the ISB with the four CTSs and writing the RO associated with a matching CTS to S and optionally to $CY'_{out}$ when a match is found. As mentioned herein above the comparison order is important thus first compare the ISB to CTS1 (i.e.: A==0, B==0, $CY'_{in}$==0) and if all bits match write the associated RO (1) to S and $CY'_{out}$ (i.e. S=$CY'_{out}$=1). Next, compare the ISB to CTS2 (A==0, B==1, $CY'_{in}$==0) and if all bits match write associated RO (0) to S and optionally to $CY'_{out}$ (i.e. S=0 and optionally $CY'_{out}$=0 as the value of CY'out is already 0). Next, compare the ISB to CTS3 (i.e.: A==1, B==1, $CY'_{in}$==1) and if all bits match write the associated RO (0) to S and optionally to $CY'_{out}$ (i.e. S=$CY'_{out}$=0). Last compare the ISB to CTS4 (i.e.: A==1, B==0, $CY'_{in}$==1) and if all bits match write the associated RO (1) to S and optionally to $CY'_{out}$ (i.e. S=1 and optionally $CY'_{out}$=1 as the value of $CY'_{out}$ is already 1).

As already noted, the RO for CTS2 and CTS4 needs to be written only to S as the value of $CY'_{out}$ is the same in the value of $CY'_{in}$ but it may also be written to $CY'_{out}$ as the new value is identical to the old value so no actual change is made. It may be appreciated that if a match was found between the ISB and a CTS, the comparison may stop as the input bits may match only one of the four predefined CTSs.

A change in a bit value can be discovered by comparing the input and the expected output values and applicant has realized that an efficient search, provided by associative computing, may be used to find all matching ISBs in a single search operation. Such a search may be based on U.S. Pat. No. 9,406,381 filed on Jan. 8, 2011, which is incorporated herein by reference and assigned to common assignee of the present application, For implementing a multi-bit full adder, the CY'out of step n may become the CY', of step n+1. The result of a multi-bit full adder (adding two N-bit numbers P and Q) is a multi-bit number R constructed from the result bit S of each full adder and the carry $CY'_{out}$ of the last full adder referred as an overflow bit.

FIGS. 6 and 7, to which reference is now made, illustrate an example showing a multi-bit adder using the one-bit adder of FIG. 5 to add two four-bit operands, P=0101 and Q=1110. The expected result R of the computation is 0011 with an expected overflow bit 1 (note the expected carry bit from the last operation is 0 as the full adder operates with the inverse of the carry).

FIG. 6 shows an input bit table 700 that comprises four rows: OP_A, OP_B, OP_CY' and S, and five columns: overflow, col 1, col 2, col 3 and col 4. The bits of the first operand 0101 are inserted to row OP_A and the bits of the second operand 1110 are inserted to row OP_B. The value of the carry is initiated to 0, so the value of the inverse of the carry is 1 and the OP_CY' row has, therefore, the bits 11111. The sum row S is initiated with the same values of OP_B, e.g. 1110.

It may be appreciated that the same computation table 410 with the identical CTSs and RO values is always used, regardless of the number of bits to be added and the value of the operands.

The computation starts with the ISB of col4 and continues until it ends with the coil, after which it provides the S bit of all columns and the inverse carry out OP_CY' of the overflow column. The ISB (bit OP_A, bit OP_B and bit OP_CY') of col4 is compared to each of the CTSs in computation table 410 (repeated in FIG. 6 for convenience). If the ISB matches a CTS, the associated RO is written to row S of the relevant column and to the OP_CY' of the next column. (e.g. when comparing the ISB of column 3 the RO is written to S bit of column 3 and to the OP_CY' bit of column 2)

In FIG. 7, the ISB comparison and its outcome are illustrated. In table 710, ISB of col4 (101) is compared first with CTS1 (000) then with CTS2 (010), CTS3 (111) and CTS4 (101). The ISB match CTS4 whose RO value is 1. Therefore, the value, 1, is written to the S row of column col4 and to row OP_CY' of the next column, col3.

In table 720, the ISB of column col3, 011, is compared with the four CTSs and no match was found. Accordingly, no write operation is performed and the values of S and OP_CY' of the next column do not change.

In table 730, the ISB from column col2, 111, is compared with the CTSs and found to match CTS3. Accordingly, the relevant RO, whose value is 0, is written to S of col2 and to OP_CY' of the previous bit, col1.

In table 740 the next ISB from column coil, is compared with the CTSs and found to match CTS2. Accordingly, the relevant RO, whose value is 0 is written to row S and to the OP_CY' of the overflow column.

The result of the computation, R, is the value, 0011, now stored in row S and the single $CY'_{out}$ bit (listed in OP-CY' row of the overflow column) which is 0. Thus, the result of the computation is 0011 with carry 1 (the inverse of $CY'_{out}$), which is the expected result of the computation.

Applicant has noted that using the same cells for input and output should sometimes be avoided, when for example, the same input is needed for more than one computation or when using a pipeline scheme in which read and write operations may be done at the same time (i.e. comparing A, B, $CY'_{in}$ at cycle n and writing the output S and $CY'_{out}$ at cycle (n+1) to have next comparing of A, B, $CY_{in}$ at the same time). In these cases, S can be stored in dedicated output cells (instead of reusing B), initiated to the same value as input bits B. In this type of embodiment, the concept of writing only changes is kept while keeping the original values of the input bits untouched.

The four steps associative full adder invention described hereinabove may be implemented using any non-destructive memory array that has two-bit lines per column using computation table 410. In the text hereinbelow, an example implementation of the four steps full adder is implemented using an in-memory computation device, described in U.S. Pat. No. 9,558,812.

Figure 8:
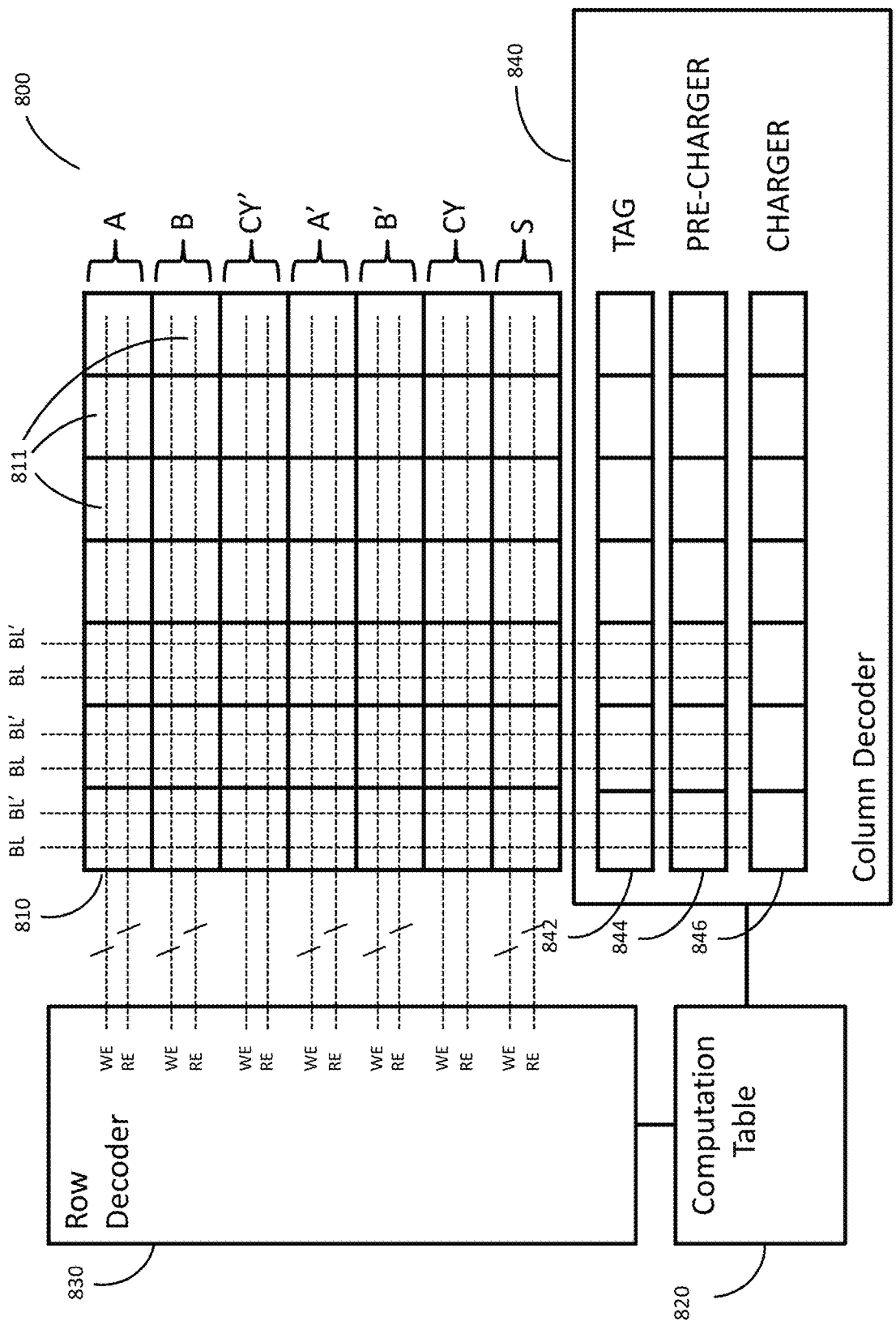

FIGS. 8 and 9, to which reference is now made, are illustrations of one exemplary embodiment of a multi-bit full adder 800, capable of adding two multi-bit numbers X and Y, constructed and operative in accordance with a preferred embodiment of the present invention. Multi-bit full adder 800 comprises a memory array 810, a computation table 820, a row decoder 830 and a column decoder 840.

The full adder computation is based on comparison between the ISB stored in memory array 810, and the four CTSs. The comparison of the two operands may be implemented using the XOR logical operation between the ISB and the CTS according to Equation 2.

$$\text{NOT(ISB XOR CTS)} \qquad \text{Equation 2}$$

Full adder 800 may perform in-memory logical operations AND and NOR using the following equivalence Equation 3.

$$(\text{ISB' AND CTS}) \text{NOR} (\text{ISB AND STC'}) \qquad \text{Equation 3}$$

In order to perform this type of computation, two cells may be used to store each bit of the ISB and two cells may be used to store each bit of each one of the four CTSs.

Memory array 810 comprises a plurality of cells 811 arranged in a matrix. All cells 811 in the same column are connected to the same bit line pair BL and BL'. All the cells in the same row are connected to the same read enable (RE) line and to the same write enable (WE) line.

The ISB and ISB' are stored in memory array 810. Several rows in memory array 810 are used to store all the bits Ai of a multi-bit binary operand X, others are used to store the bits Bi of a second multi-bit binary operand Y. One row, CY' is used to store the inverse of the carry. In addition, several rows in memory array 810 are used to store A'i (the inverse bits of operand X) others are used to store B'i (the inverse bits of operand Y) and one row may store the carry CY.

The sum of the computation may be stored in dedicated rows Si, initiated with the same bit values as Bi. (As described above, Si may also be stored in the same rows as Bi). The number of rows in A, A', B, B' and S may be the number of bits in operands X and Y. Each row may be connected to a different RE line and a different WE line. CY and CY' may be a single row each.

Computation table 820 comprises the CTSs to compare with the ISB and the RO to write if a match was found.

Row decoder 830 comprises a plurality of read enabled (RE) lines and write enabled (RE) lines and may have access to computation table 820. Row decoder 830 may select a row for reading and may select a row for writing based on computation table 820.

Row decoder 830 may select a row for reading by activating the corresponding RE line. The row selection for reading may be performed by charging the relevant RE lines. Several RE lines may be activated simultaneously to receive the logical NOR operation between cells on the same column. (As described in U.S. Pat. No. 8,238,173). During the comparison step the RE lines of the relevant bits of the ISB may be activated. The corresponding ISB rows may be selected according to value of the bits of the compared CTS. A value of 1 in the CTS may correspond to activating the relevant RE of the ISB and a value of 0 in the CTS may correspond to not activating the relevant RE.

Row decoder 830 may select a row for writing by activating the corresponding WE line. Several WE lines may be activated simultaneously enabling multi-write operations. The row selection for writing may be performed by charging the relevant WE lines. During the write operation of the RO, the WE of the relevant rows of S and/or $CY_{out}$ and $CY_{in}$ may be activated.

Column decoder 840 may have access to computation table 820 and may control the column selection by pre-charging and/or charging bit lines BL and BL' of the selected column with the appropriate voltage according to the needed operation: read or write. Column decoder 840 comprises a TAG unit 842, a pre-charger 844 and a charger 846.

TAG unit 842 may serve for storing the result of the comparison done between the ISB stored in the column and a CTS. Each column may have a dedicated TAG element in TAG unit 842. The TAG of the corresponding column may have the value 1, if a match was found between the ISB and the CTS and may have the value 0 otherwise. The value of the TAG is the result of the logical NOR performed between all activated cells on the specified column.

Pre-charger 844 may pre-charge BL and BL' of all columns in order to perform the comparison between the ISB stored in the activated column and a CTS.

For all columns where the TAG value is 1, charger 846 may charge BL and BL' according to the value of relevant RO in computation table 820. If the RO value is 1, charger 846 may charge BL to 1 and BL' to 0 and if the value of the RO is 0 charger 846 may charge BL to 0 and BL' to 1. BL and BL' of all other columns (columns with TAG value 0) may be charged to 1 to prevent writing.

FIG. 9 illustrates computation table 820 with the values of the CTSs needed to perform the comparison using only NOR and AND logical operations. It includes the value of the original CTSs (as detailed in computation table 410) concatenated with their inverse as needed for the computation. The RE lines values are set according to the value of the relevant bits in the compared CTS. As described hereinabove, only when the value of a CTS bit is 1 the corresponding RE is charged.

Computation table 820' is similar to computation table 820 with regards to the values of the different CTS. It has separate RO row for S and for CY' to enable writing only S when there is no need to write CY' as the case is in steps 2 and step 4.

It may be appreciated that full adder 800 may perform a multi-bit addition on each and every column of memory array 810, thus the number of concurrent multi-bit addition may be defined by the number of columns in memory array 810.

Figure 10:
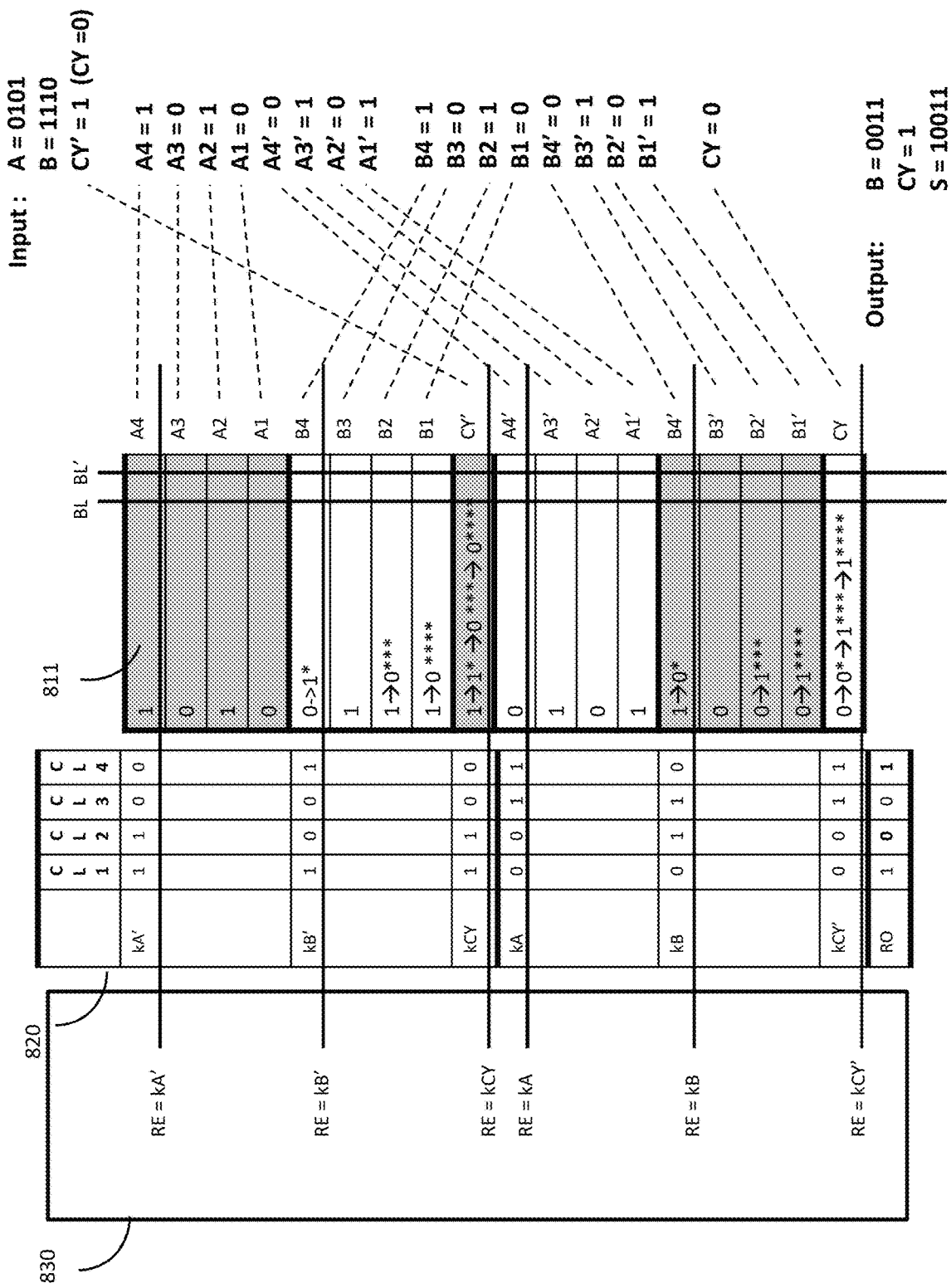
FIG. 10 is an illustration of an example computation performed using the embodiment described in FIGS. 8 and 9.

FIG. 10, to which reference is now made, is an illustration of an example computation performed using the embodiment described hereinabove for an addition of two operands on one specific column of memory array 810. It may be appreciated that the same computation may be done on each column of memory array 810 providing mass multi-bit adder functionality.

In this example, two multi-bit numbers, (the same used in a previous example in FIGS. 6 and 7) are added. The bits of the first operand (0101) may be written to the A cells and bits of the second operand (1110) may be written to the B cells. In this example A, B and S are comprised of four rows each as the number of bits of the operands is four. The inverse bits of the first operand (1010) may be written to the A' cells and inverse bits of the second operand (0001) are written to the B' cells.

Computation table 820 may include the CTS value used in each clock cycle, clk1, clk2, clk3 and clk4 and the needed RO values. The RE line of each operand may obtain its value from the relevant bit of the relevant CTS in the respected cycle. The calculation of each TAG is done according to Equation 4:

$$\mathrm{TAG} = \overline{(kA''A)} \overline{\vee} \overline{(kB''B)} \overline{\vee} \overline{(kCY''CY)} \overline{\vee} \overline{(kA'A')} \overline{\vee} \overline{(kB'B')} \overline{\vee} \overline{(kCY'CY)} \quad \text{Equation 4}$$

Where:
kA' is the value taken from the A' row of the relevant CTS.
A is the value taken from operand A of the ISB.
kB' is the value taken from the B' row of the relevant CTS.
B is the value taken from operand B of the ISB.
kCY is the value taken from the CY row of the relevant CTS.
CY' is the value taken from operand CY' of the ISB.
kA is the value taken from the A row of the relevant CTS.
A' is the value taken from operand A' of the ISB.
kB is the value taken from the B row of the relevant CTS.
B' is the value taken from operand B' of the ISB.
kCY' is the value taken from the CY' row of the relevant CTS.
CY is the value taken from operand CY of the ISB.

In the first step of the computation the TAG of ISB of the fourth bit is calculated. The value of the ISB corresponding to the fourth bit (A4, B4, CY', A4', B4' CY—101010) is compared to CTS 1 (111000), CTS 2 (101010), CTS 3 (000111) and CTS 4 (010101) one after the other using Equation 4.

Compare to CTS1: $(1 \wedge 1) \overline{\vee} (1 \wedge 0) \overline{\vee} (1 \wedge 1) \overline{\vee} (0 \wedge 0) \overline{\vee} (0 \wedge 1) \overline{\vee} (0 \wedge 0) = 0$ Compare to CTS2: $(1 \wedge 1) \overline{\vee} (0 \wedge 0) \overline{\vee} (1 \wedge 1) \overline{\vee} (0 \wedge 0) \overline{\vee} (1 \wedge 1) \overline{\vee} (0 \wedge 0) = 0$ Compare to CTS3: $(0 \wedge 1) \overline{\vee} (0 \wedge 0) \overline{\vee} (0 \wedge 1) \overline{\vee} (1 \wedge 0) \overline{\vee} (1 \wedge 1) \overline{\vee} (1 \wedge 0) = 0$ Compare to CTS4: $(0 \wedge 1) \overline{\vee} (1 \wedge 0) \overline{\vee} (0 \wedge 1) \overline{\vee} (1 \wedge 0) \overline{\vee} (0 \wedge 1) \overline{\vee} (1 \wedge 0) = 1$ A match (the result of the calculation is 1) was found to CTS4, therefore the value B4 and the value of CY' are set to the value of RO4 which is 1 and the value of B4' and CY are set to the inverse of the RO which is 0.

Next, the value of the ISB of the third bit (A3, B3, CY', A3', B3' CY—011100) is compared to CTS 1 (111000), CTS 2 (101010), CTS 3 (000111) and CTS 4 (010101) one after the other using Equation 4.

Compare to CTS 1: $(1 \wedge 0) \overline{\vee} (1 \wedge 1) \overline{\vee} (1 \wedge 1) \overline{\vee} (0 \wedge 1) \overline{\vee} (0 \wedge 0) \overline{\vee} (0 \wedge 0) = 0$ Compare to CTS 2: $(1 \wedge 0) \overline{\vee} (0 \wedge 1) \overline{\vee} (1 \wedge 1) \overline{\vee} (0 \wedge 1) \overline{\vee} (1 \wedge 0) \overline{\vee} (0 \wedge 0) = 0$ Compare to CTS 3: $(0 \wedge 0) \overline{\vee} (0 \wedge 1) \overline{\vee} (0 \wedge 1) \overline{\vee} (1 \wedge 1) \overline{\vee} (1 \wedge 0) \overline{\vee} (1 \wedge 0) = 0$ Compare to CTS 4: $(0 \wedge 0) \overline{\vee} (1 \wedge 1) \overline{\vee} (0 \wedge 1) \overline{\vee} (1 \wedge 0) \overline{\vee} (0 \wedge 0) \overline{\vee} (1 \wedge 0) = 0$ No match was found so there is no consecutive write operation.

Next, the value of the ISB corresponding to the second bit (A2, B2, CY', A2', B2' CY—111000) is compared to CTS 1 (111000), CTS 2 (101010), CTS 3 (000111) and CTS 4 (010101) one after the other using Equation 4.

Compare to CTS 1: $(1 \wedge 1) \overline{\vee} (1 \wedge 1) \overline{\vee} (1 \wedge 1) \overline{\vee} (0 \wedge 0) \overline{\vee} (0 \wedge 0) \overline{\vee} (0 \wedge 0) = 0$ Compare to CTS 2: $(1 \wedge 1) \overline{\vee} (0 \wedge 1) \overline{\vee} (1 \wedge 1) \overline{\vee} (0 \wedge 0) \overline{\vee} (1 \wedge 0) \overline{\vee} (0 \wedge 0) = 0$ Compare to CTS 3: $(0 \wedge 1) \overline{\vee} (0 \wedge 1) \overline{\vee} (0 \wedge 1) \overline{\vee} (1 \wedge 0) \overline{\vee} (1 \wedge 0) \overline{\vee} (1 \wedge 0) = 1$ Compare to CTS 4: $(0 \wedge 1) \overline{\vee} (1 \wedge 1) \overline{\vee} (0 \wedge 1) \overline{\vee} (1 \wedge 0) \overline{\vee} (0 \wedge 0) \overline{\vee} (1 \wedge 0) = 0$ A match was found to CTS3, therefore the value B2 and the value of CY' are set to 0 and the value of B2' and CY are set to 1.

Last, the value of the ISB of the last bit of the operands (A1, B1, CY', A1', B1' CY—010101) is compared to CTS 1 (111000), CTS 2 (101010), CTS 3 (000111) and CTS 4 (010101) one after the other using Equation 4.

Compare to CTS 1: $(1 \wedge 0) \overline{\vee} (1 \wedge 1) \overline{\vee} (1 \wedge 0) \overline{\vee} (0 \wedge 1) \overline{\vee} (0 \wedge 0) \overline{\vee} (0 \wedge 1) = 0$ Compare to CTS 2: $(1 \wedge 0) \overline{\vee} (0 \wedge 1) \overline{\vee} (1 \wedge 0) \overline{\vee} (0 \wedge 1) \overline{\vee} (1 \wedge 0) \overline{\vee} (0 \wedge 1) = 1$ Compare to CTS 3: $(0\wedge 0)\overline{\vee}(0\wedge 1)\overline{\vee}(0\wedge 0)\overline{\vee}(1\wedge 1)$ $\overline{\vee}(1\wedge 0)\overline{\vee}(1\wedge 1)=0$ Compare to CTS 4: $(0\wedge 0)\overline{\vee}(1\wedge 1)\overline{\vee}(0\wedge 0)\overline{\vee}(1\wedge 1)$ $\overline{\vee}(0\wedge 0)\overline{\vee}(1\wedge 1)=0$ A match was found to CTS2, therefore the value B2 and the value of CY' are set to 0 and the value of B2' and CY are set to 1.

The result of the calculation S is in cells B4=1, B3=1, B2=0 and B1=0 and the carry CY is 1 which makes the expected result.

As noted before, it is possible to use dedicated cells for S and not overwrite the value stored in B and there may be a separated RO for S and for $CY_{out}$. It may be appreciated that the order of comparing the ISB may not be important if dedicated cells for S were used. It may also be appreciated that the order of comparing the ISB with the CTSs may be important only when the ISB is compared to all four CTS. If the computation is stopped when a match was found, the order of comparison has no significance. In addition, the order of the CTSs may be different than the one described hereinabove as long as the new sequence of bits, after applying the new RO, may not match any remaining CTS. I.e. CTS 2 (010 with RO 0) must be after CTS 1 (000 with RO 1) and CTS4 (101 with RO 1) must be after CTS3 (111 with RO 0).

Figure 11:
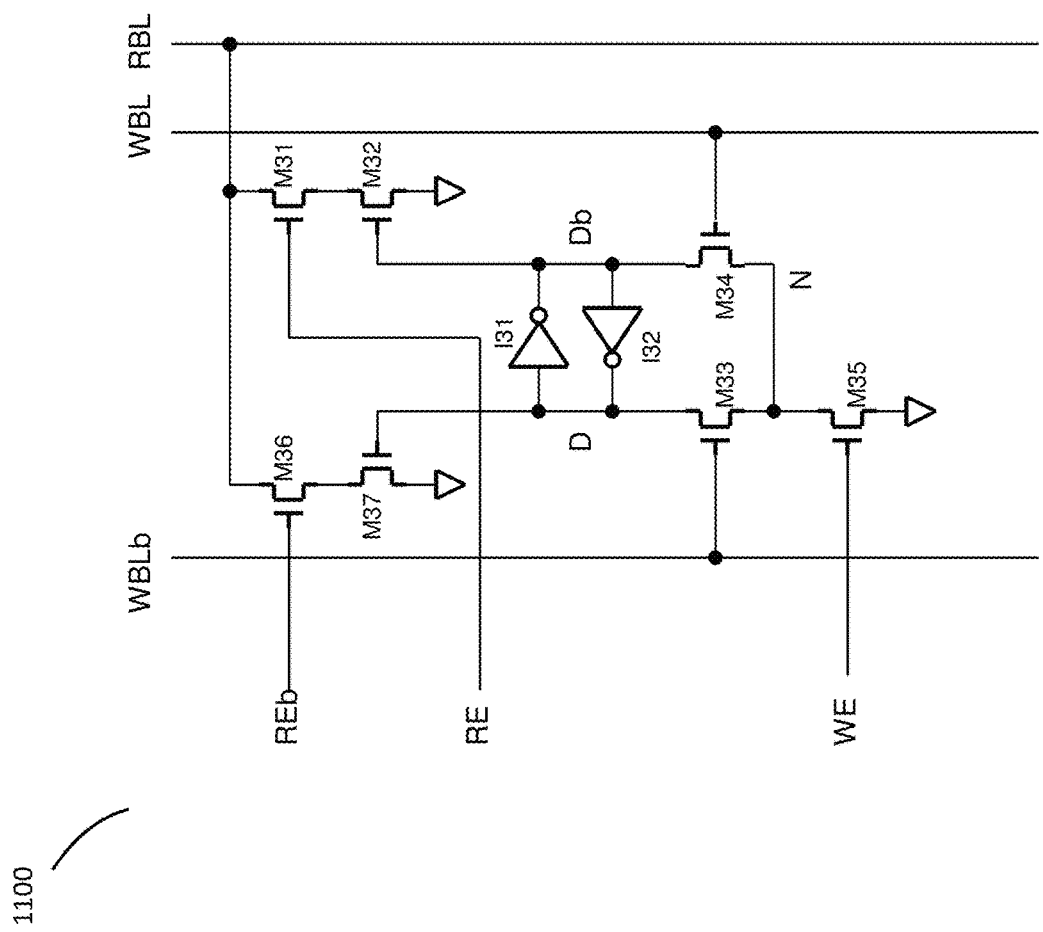
FIG. 11 is a schematic illustration of a dual port SRAM cell capable of performing a XOR Boolean operation.

FIG. 11 is a description of a dual port SRAM cell capable of performing a XOR Boolean operation as described in U.S. provisional patent application 62/430,767, owned by the Applicant of the present application and filed 6 Dec. 2016, entitled "COMPUTATIONAL DUAL PORT SRAM CELL AND PROCESSING ARRAY DEVICE USING THE DUAL PORT SRAM CELLS FOR XOR AND XNOR COMPUTATIONS", also filed as U.S. patent application Ser. No. 15/709,401 on Sep. 19, 2017 and issued as U.S. Pat. No. 10,240,362 on Apr. 2, 2019.

Figure 12:
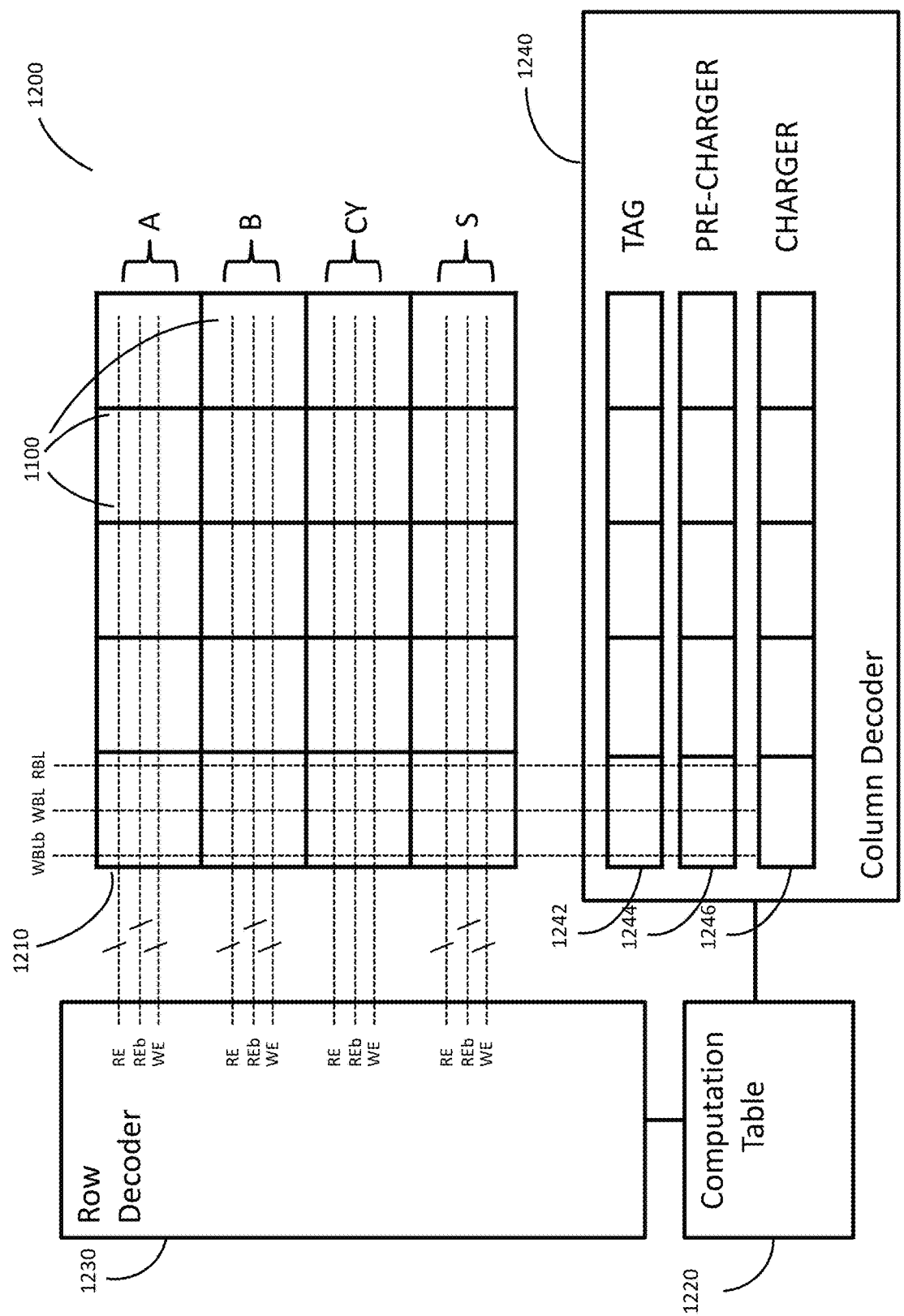
FIG. 12 is a schematic illustration of an alternative embodiment of a multi-bit full adder using the dual port SRAM cell of FIG. 11.

FIG. 12 is a schematic illustration of an alternative embodiment of a multi-bit full adder 1200, capable of adding two multi-bit numbers X and Y, constructed and operative in accordance with another preferred embodiment of the present invention. Multi-bit full adder 1200 comprises a memory array 1210 comprised of a plurality of dual port SRAM cells 1100 of FIG. 11, a computation table 1220, a row decoder 1230 and a column decoder 1240.

As explained hereinabove, the full adder computation is based on comparison between the ISB stored in memory array 1210, and four CTSs. Full adder 1200 may perform in-memory logical operations XOR thus may perform the comparison using the XOR operation according to Equation 2.

The comparison may be done by loading the CTSs values to the RE and REb lines. When the bit of the CTS is 1, the value of RE is set to 1 and the value of REb is set to 0. When the bit of the CTS is 0, the value of RE is set to 0 and the value of REb is set to 1. If the ISB is identical to the CTS, the value of RBL will be equal to 1. If at least one bit differs between the ISB and the CTS, the RBL will be discharged to 0 indicating no match was found. The rest of the computation details of this embodiment are similar to ones of the multi-bit full adder 800. It may be appreciated that the four computation steps may be performed by multi-bit full adder 1200 in four clock cycles.

It may be appreciated that the exact arrangement of the two multi-bit numbers, the sum and the carry inside the memory may be any arrangement and not necessarily as illustrated hereinabove. The only requirement is to have the bits from the same position in the multi-bit numbers located on the same column and sharing the same bit lines (i.e. the MSB of the two operands and the result should be located on the same column, and so on until the LSB. In addition, the first carry, initiated to 0, is located on the same column as the LSB and the resultant carry of the first computation should be located on the same column as the LSB+1 and so on).

Unless specifically stated otherwise, as apparent from the preceding discussions, it is appreciated that, throughout the specification, discussions utilizing terms such as "processing," "computing," "calculating," "determining," or the like, refer to the action and/or processes of a general purpose computer of any type such as a client/server system, mobile computing devices, smart appliances or similar electronic computing device that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatus for performing the operations herein. This apparatus may be specially constructed for the desired purposes, or it may comprise a general-purpose computer selectively activated or reconfigured by a computer program stored in the computer. The resultant apparatus when instructed by software may turn the general purpose computer into inventive elements as discussed herein. The instructions may define the inventive device in operation with the computer platform for which it is desired. Such a computer program may be stored in a computer readable storage medium, such as, but not limited to, any type of disk, including optical disks, magnetic-optical disks, read-only memories (ROMs), volatile and non-volatile memories, random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. An in-memory full adder comprising:
   a memory array having a plurality of rows and columns, at least one said column being connected by a bit line, said at least one column storing a first bit in a first row of said bit line, a second bit in a second row of said bit line, and an inverse of a carry-in bit in a third row of said bit line;
   a full adder unit to store, in said second and third rows of said bit line, a sum bit and a carry out bit output, respectively, of adding said first bit, said second bit and said carry-in bit, said full adder unit not to overwrite any of said bits when a full adder table indicates that said sum bit and said carry out bit are equivalent to said second bit and said carry-in bit.

2. The adder of claim 1 and wherein said full adder unit comprises:
- a computation table to store a set of change trigger sequences, and an associated value for said sum and carry-out bits per sequence;
- a row decoder to activate said first, said second and said third rows according to said set of change trigger sequences, one current sequence at a time; and
- a column decoder to receive a compare result from said bit line indicating a match of data stored in said column to said current change trigger sequence,
- said row decoder to activate a sum row and a carry-out row of said memory array and said column decoder to write a sum bit and a carry-out bit associated with said current change trigger sequence in said sum row and said carry-out row through said bit line if said compare result indicates a match.

3. The adder of claim 2 wherein said set of change trigger sequences are 000, 010, 111 and 101 and their associated values for the sum and carry-out bits are 1, 0, 0 and 1 respectively.

4. The adder of claim 1 and wherein said full adder unit operates on said plurality of columns in parallel.

\* \* \* \* \*